(12) United States Patent
Pan et al.

(10) Patent No.: US 6,883,932 B2
(45) Date of Patent: Apr. 26, 2005

(54) APPARATUS FOR IMPROVING UNIFORMITY USED IN A BACKLIGHT MODULE

(75) Inventors: I-Kai Pan, Kaohsiung (TW); Po-Hung Yau, Kaohsiung (TW); Yu-Nan Pao, Hsinchu (TW); Chi-Feng Chen, Yunlin Hsien (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 10/668,169

(22) Filed: Sep. 24, 2003

(65) Prior Publication Data

US 2005/0013131 A1 Jan. 20, 2005

(30) Foreign Application Priority Data

Jul. 17, 2003 (TW) ................................ 92119538 A

(51) Int. Cl.[7] .................................................. F21S 4/00
(52) U.S. Cl. ........................... 362/225; 362/27; 362/29; 362/31; 362/558; 362/561
(58) Field of Search ............................ 362/225, 26, 27, 362/29, 31, 558–561, 240, 241, 246; 349/58, 349/62, 67, 69, 70

(56) References Cited

U.S. PATENT DOCUMENTS

| 4,425,604 | A | * | 1/1984 | Imai et al. ................... 362/223 |
| 5,253,151 | A | * | 10/1993 | Mepham et al. ............. 362/216 |
| 5,822,029 | A | * | 10/1998 | Davis et al. ................. 349/115 |
| 6,327,091 | B1 | * | 12/2001 | Agano ........................ 359/619 |

* cited by examiner

*Primary Examiner*—Sandra O'Shea
*Assistant Examiner*—Mark Tsidulko
(74) *Attorney, Agent, or Firm*—Bacon & Thomas

(57) ABSTRACT

An apparatus for improving uniformity used in backlight module is disclosed, which includes a plurality of light sources for providing an illuminating light; a reflective housing adjacent to the light sources for receiving the light sources and reflecting the illuminating light; and at least one structured arc sheet locating at the periphery of the light source for making the illuminating light uniform.

10 Claims, 4 Drawing Sheets

APPARATUS FOR IMPROVING UNIFORMITY USED IN A BACKLIGHT MODULE

BACKGROUND OF THE INVENTION

1. Field of the Invention

The present invention relates to an apparatus for improving uniformity used in a backlight module and, more particularly, to an apparatus that provides improved illumination uniformity for a liquid crystal display (LCD) or a liquid crystal TV.

2. Description of Related Art

Currently, there are two types of lighting module for a flat panel display. One is the back type, and the other is the front type. The backlight module is further classified as a sidelight (edge-light) type and a directly-under-light (bottom light) type according to their locations of light sources. The directly-under-light backlight module is mostly used in a stationary product, such as a desktop LCD or an LC TV as it has a heavy appearance. Because the light source of a directly-under-light backlight module is located right under the displaying area, the profile of the light sources easily causes a non-uniformity of brightness, shadows, or line defects to the displaying image. Generally, a light-diffusing sheet is used to uniformly diffuse the illuminating light so that the shadows or line defects are blurred. Additionally, some light diffusing sheets are mounted with micro particles having various sizes and densities for refracting or diffusing the illuminating light as uniformly as possible. However, the illuminating light will be absorbed when passing through the light-diffusing sheet and only about 50% of the original is remains, which leads to a low efficiency of light utility rate.

Therefore, it is desirable to provide an improved an apparatus for improving uniformity used in a backlight module to mitigate and/or obviate the aforementioned problems.

SUMMARY OF THE INVENTION

The object of the present invention is to provide an apparatus for improving uniformity used in backlight module so that the shadows or line defects are prevented from appearing, the uniformity and utility rate of illuminating light are increased, and an improved image quality is obtained.

To achieve the object, the apparatus for improving uniformity used in backlight module of the present invention includes a plurality of light sources for providing an illuminating light; a reflective housing adjacent to the light sources for receiving the light sources and reflecting the illuminating light; and at least one structured arc sheet locating at the periphery of the light source for making the illuminating light uniform.

The light source of the apparatus for improving uniformity used in backlight module of the present invention is preferably a light-emitting diode, an electro-luminescent device, or a cold cathode fluorescent lamp. The arrangement of the light sources is not restricted. Preferably, the light sources are parallel and equally spaced to each other. Preferably, the reflective housing of the present invention is made by stamping or by extrusion. More preferably, the surface of the reflective housing is coated with a reflecting and diffusing material. The apparatus for improving uniformity used in the backlight module of the present invention preferably further comprises a light enhancement unit for raising the semi-brightness angle of the illuminating light, and more preferably the light sources are located between the light enhancement unit and the reflective housing. The structured arc sheet of the present invention is preferably made of total reflection, transparent, or semi-reflection and semi-transparent materials. The curvature diameter of the structured arc sheet is not restricted and is preferably longer than the diameter of the CCFL. The structured arc sheet is preferably made of metal, polymethyl methacrylate (PMMA), polycarbonate (PC), or glass. Preferably, each of the light sources of the present invention has two structured arc sheets at its periphery, and the angle included by the two structured arc sheets ranges from 30 degrees to 270 degrees. The relative position of the two structured arc sheets is not restricted, and could be at the same plane or not. Preferably, the structured arc sheets are at the same plane. The thicknesses of the structured arc sheets could be the same or different, as could be the curvatures of the structured arc sheets. Preferably, the apparatus for improving uniformity used in the backlight module of the present invention is used in a liquid crystal display (LCD).

Other objects, advantages, and novel features of the invention will become more apparent from the following detailed description when taken in conjunction with the accompanying drawings.

DETAILED DESCRIPTION OF THE PREFERRED EMBODIMENT

Figure 1:
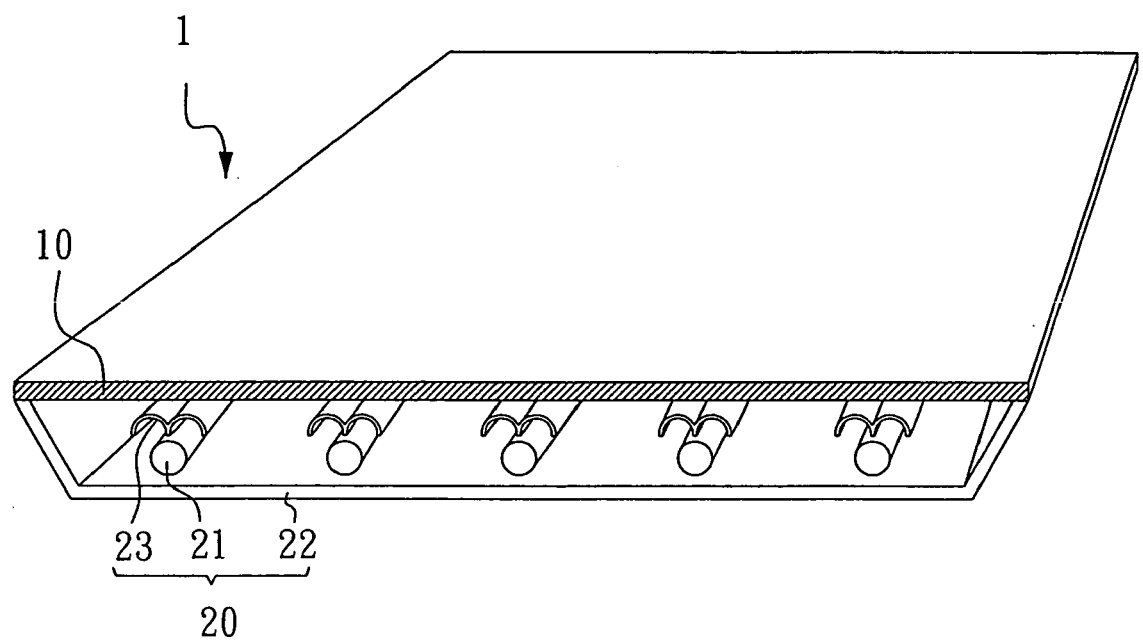
FIG. 1 is a perspective view of a preferred embodiment of the backlight module of the present invention.

With reference to FIG. 1, there is shown a perspective view of a preferred embodiment of the present invention. The liquid crystal display 1 includes a liquid crystal module (LCM) 10 and a backlight module 20. The liquid crystal module 10 is composed of two substrates and a liquid crystal layer therebetween. The backlight module 20 has a plurality of light sources 21, a reflective housing 22, and structured arc sheets 23. The light sources 21 are parallel cold cathode fluorescent lamps below the liquid crystal module 10 to which the light sources provide the illuminating light. The reflective housing 22 is below the light sources 21 for receiving the light sources 21 and reflecting the illuminating light. The structured arc sheet 23 may be located at any side of the light source 21 and between the liquid crystal module 10 and the reflective housing 22. In the present example, two reflective structured arc sheets are mounted over each CCFL for alternating the pathway of the illuminating light and making the illuminating light uniform.

Figure 2:
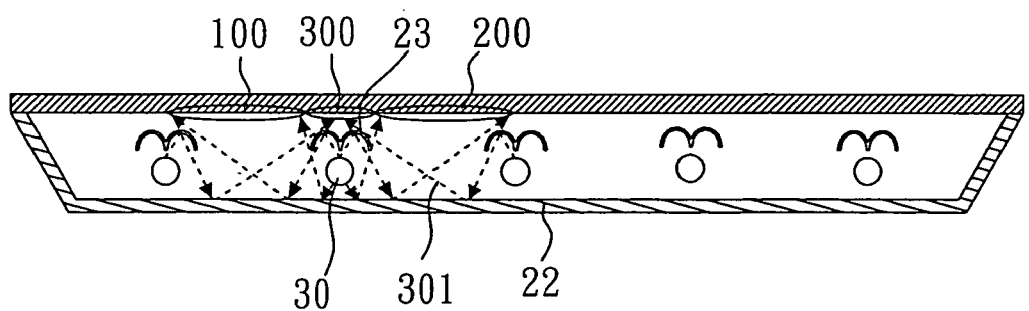
FIG. 2 is a cross-section that illustrates the pathway of the illuminating light of the preferred embodiment of the present invention.
Figure 3A:
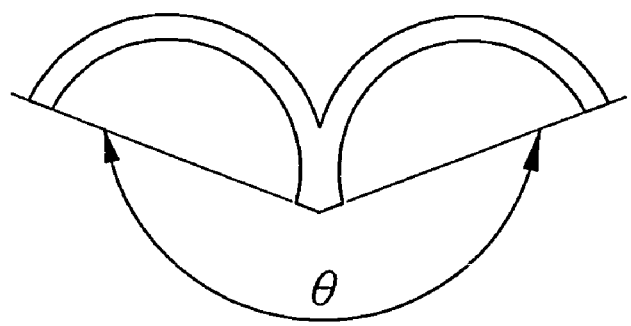
FIGS. 3a–3c are perspective views of the various combinations of the structured arc sheets of the present invention.
Figure 3B:
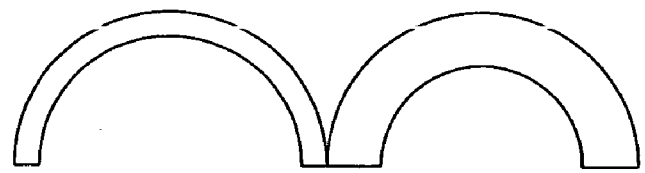
Figure 3C:
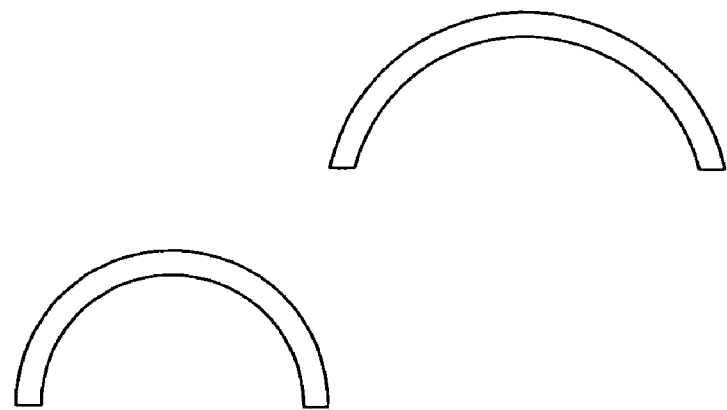

With reference to FIG. 2, there is shown a cross-section that illustrates the pathway of the illuminating light of the preferred embodiment of the present invention. The illuminating light 301 from lamp 30 is reflected by the structured arc sheets 23 or the reflective housing 22 firstly, then reflected by the reflective housing 22 or the structured arc sheet 23, respectively, and finally arrives at the regions 100 and 200. Intuitively, the line defects over the rim of lamp 30 are avoided. However, the illumination of the region 300 over the lamp 30 is reduced. Therefore, the parameters of the structured arc sheets, such as curvature, shape, thickness, location, or material, etc. are adjusted appropriately to meet the requirements. For example, as shown in FIG. 3a, the angle θ included by the two structured arc sheets may range from 30 degrees to 270 degrees. The two structured arc sheets are at the same plane, and have the same curvature diameter but different thicknesses, as shown in FIG. 3b. Furthermore, the two structured arc sheets may have different curvatures at different planes, as shown in FIG. 3c. The light is emitted from the neighboring lamps of lamp 30 and then reflected by the structured arc sheets thereof to make up the insufficient illumination of the region 300 over the lamp 30. Consequently, a uniform illuminating light is obtained through the optimum design and arrangement of the structured arc sheets.

Figure 4:
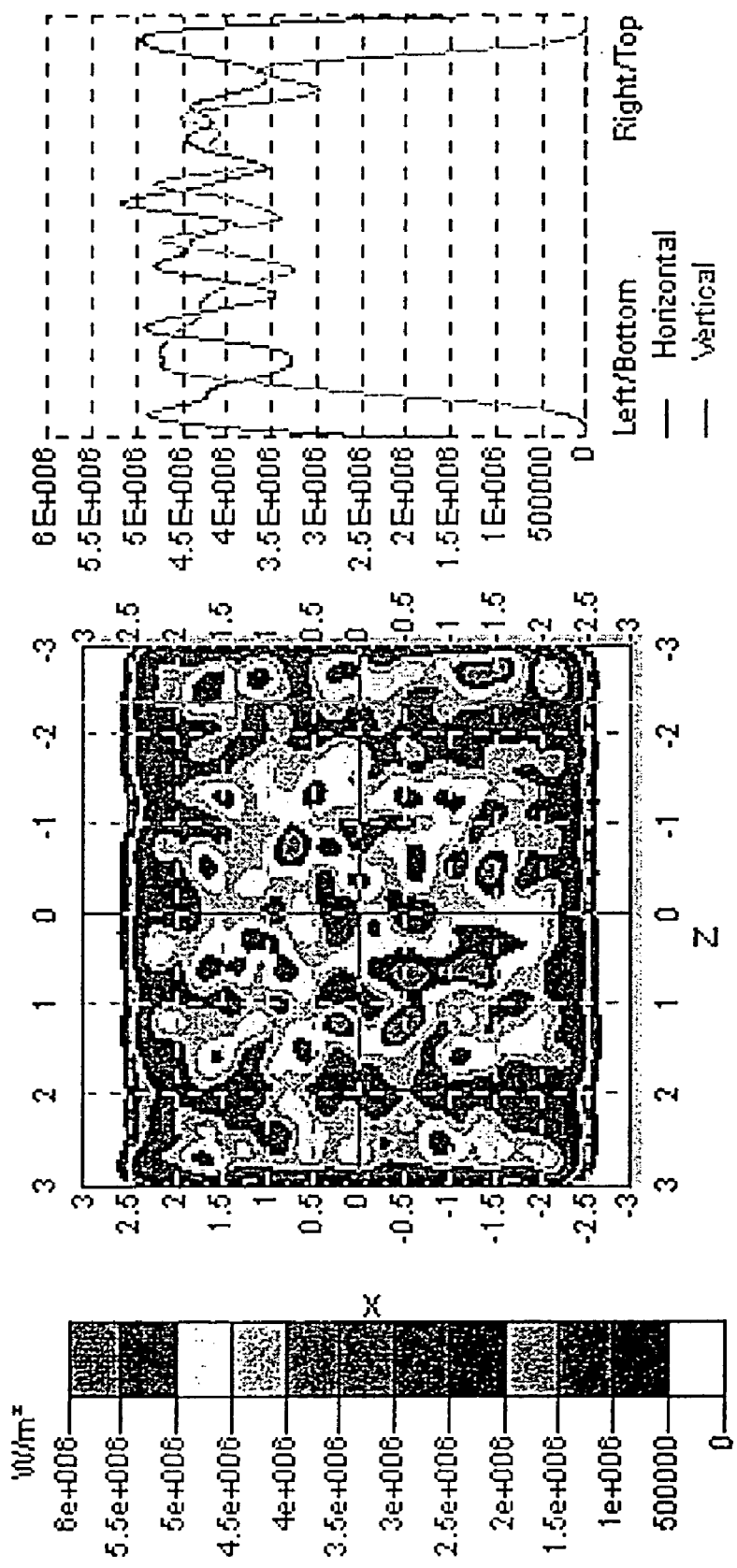
FIG. 4 shows the simulation result of the preferred embodiment of the present invention.
Figure 5:
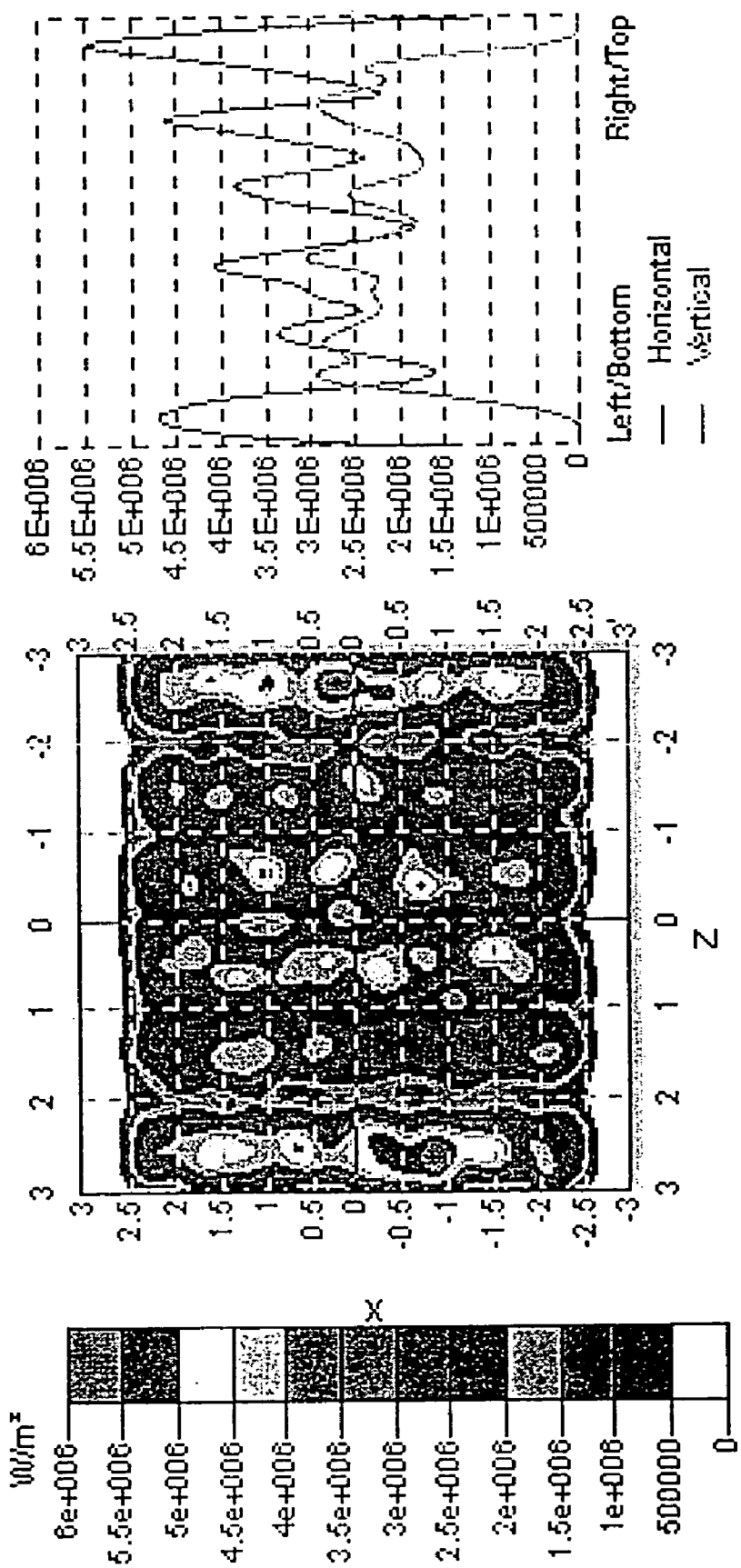
FIG. 5 shows the simulation result of no structured arc sheet.

Afterwards, the TracePro® simulation software is used to carry out a simulation of the dispersion of the illuminating light. FIG. 4 shows the simulation result of the preferred embodiment of the present invention, wherein each CCFL has two structured arc sheets at its periphery. Comparatively, FIG. 5 illustrates the simulation result of no structured arc sheet being used. It can be seen clearly from FIGS. 4 and 5 that the directly-under-light backlight module of the present invention has an enhanced uniformity of illuminating light, no shadows or line defects, and about 70% of utility rate of light so that a vast improvement in image quality is obtained. Furthermore, due to the variety of the adjustable parameters, such as curvature, shape, thickness, location, or material etc. of the structured arc sheets, the displaying performance of the liquid crystal display may be optimized through appropriate regulating of the aforementioned parameters.

Although the present invention has been explained in relation to its preferred embodiment, it is to be understood that many other possible modifications and variations can be made without departing from the spirit and scope of the invention as hereinafter claimed.

What is claimed is:

1. An apparatus for improving uniformity used in a backlight module comprising:
   a plurality of light sources for providing an illuminating light;
   a reflective housing adjacent to the light sources for receiving the light sources and reflecting the illuminating light; and
   two structured arc sheets mounted at the periphery of the light source for making the illuminating light uniform, wherein the angle included by said structured arc sheets ranges from 30 degrees to 270 degrees.

2. The apparatus as claimed in claim 1, wherein the two structured arc sheets are in the same plane.

3. The apparatus as claimed in claim 1, wherein the structured arc sheet is made of metal, polymethyl methacrylate (PMMA), polycarbonate (PC), or glass.

4. The apparatus as claimed in claim 1, wherein the apparatus is used in a liquid crystal display.

5. The apparatus as claimed in claim 1 wherein the two structured arc sheets are not in the same plane.

6. An apparatus for improving uniformity used in a backlight module comprising:
   a plurality of light sources for providing an illuminating light;
   a reflective housing adjacent to the light sources for receiving the light sources and reflecting the illuminating light; and
   two structured arc sheets mounted at the periphery of the light source for making the illuminating light uniform, wherein said structured arc sheets have different thickness or curvature.

7. The apparatus as claimed in claim 6, wherein the two structured arc sheets are in the same plane.

8. The apparatus as claimed in claim 6, wherein the structured arc sheet is made of metal, polymethyl methacrylate (PMMA), polycarbonate (PC), or glass.

9. The apparatus as claimed in claim 6, wherein the apparatus is used in a liquid crystal display.

10. The apparatus as claimed in claim 6 wherein the two structured arc sheets are not in the same plane.

* * * * *